United States Patent
Roberts, III et al.

(10) Patent No.: US 9,221,218 B2
(45) Date of Patent: Dec. 29, 2015

(54) METHODS OF MAKING A COMPOSITE SHEET AND COMPOSITE COMPONENT AND A COMPOSITE

(71) Applicant: GENERAL ELECTRIC COMPANY, Schenectady, NY (US)

(72) Inventors: Herbert Chidsey Roberts, III, Simpsonville, SC (US); Gregory S. Corman, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 247 days.

(21) Appl. No.: 13/689,195

(22) Filed: Nov. 29, 2012

(65) Prior Publication Data

US 2014/0148543 A1    May 29, 2014

(51) Int. Cl.
| | |
|---|---|
| *B29C 70/30* | (2006.01) |
| *B29C 70/36* | (2006.01) |
| *C08J 5/04* | (2006.01) |
| *B29C 70/10* | (2006.01) |
| *B32B 18/00* | (2006.01) |

(Continued)

(52) U.S. Cl.
CPC ............ *B29C 70/36* (2013.01); *B29C 70/10* (2013.01); *B32B 18/00* (2013.01); *C04B 35/08* (2013.01); *C04B 35/117* (2013.01); *C04B 35/14* (2013.01); *C04B 35/185* (2013.01); *C04B 35/488* (2013.01); *C04B 35/50* (2013.01); *C04B 35/565* (2013.01); *C04B 35/803* (2013.01); *C04B 35/806* (2013.01); *C08J 5/04* (2013.01); *C04B 2235/524* (2013.01); *C04B 2235/526* (2013.01); *C04B 2235/5224* (2013.01); *C04B 2235/5228* (2013.01); *C04B 2235/5232* (2013.01); *C04B 2235/5236* (2013.01); *C04B 2235/5244* (2013.01); *C04B 2235/5248* (2013.01); *C04B 2235/5264* (2013.01); *C04B 2235/5268* (2013.01); *C04B 2237/38* (2013.01)

(58) Field of Classification Search
USPC ........................... 264/29.1, 71, 273, 344, 345
See application file for complete search history.

(56) References Cited

U.S. PATENT DOCUMENTS

| | | | |
|---|---|---|---|
| 4,397,713 A | 8/1983 | Lambrecht | |
| 4,594,086 A | 6/1986 | Mosnier | |

(Continued)

FOREIGN PATENT DOCUMENTS

| | | |
|---|---|---|
| EP | 0564245 A2 | 10/1993 |
| EP | 1930548 A2 | 6/2008 |

OTHER PUBLICATIONS

Copy of PCT Search Report and Written Opinion issued in connection with corresponding Application No. PCT/US2013/069527 on Mar. 27, 2014.

*Primary Examiner* — Atul P. Khare
(74) *Attorney, Agent, or Firm* — McNees Wallace & Nurick LLC

(57) ABSTRACT

A method of making a composite sheet, a method of making composite component and a composite component are provided. The method of making a composite sheet includes providing a container, adding a binder to the container, adding a plurality of randomly oriented fibers to the binder in the container, and subjecting the container to motion to coat the plurality of randomly oriented fibers with the binder. The method includes curing the binder and coated plurality of randomly oriented fibers to form a composite sheet. The plurality of randomly oriented fibers of the composite sheet are interlocked within the binder. The composite has uniform strength in all planar directions.

14 Claims, 5 Drawing Sheets

(51) Int. Cl.
| | |
|---|---|
| *C04B 35/08* | (2006.01) |
| *C04B 35/117* | (2006.01) |
| *C04B 35/14* | (2006.01) |
| *C04B 35/185* | (2006.01) |
| *C04B 35/488* | (2006.01) |
| *C04B 35/50* | (2006.01) |
| *C04B 35/565* | (2006.01) |
| *C04B 35/80* | (2006.01) |
| *C08J 5/24* | (2006.01) |

(56) References Cited

U.S. PATENT DOCUMENTS

| | | | |
|---|---|---|---|
| 4,889,686 | A | 12/1989 | Singh et al. |
| 5,192,387 | A | 3/1993 | Buckley |
| 5,294,489 | A * | 3/1994 | Luthra et al. .................. 428/379 |
| 5,413,750 | A | 5/1995 | Kelman et al. |
| 6,086,813 | A * | 7/2000 | Gruenwald .................. 264/460 |
| 6,153,291 | A | 11/2000 | Strasser |
| 7,597,760 | B2 * | 10/2009 | Lammers et al. ............. 118/302 |

* cited by examiner

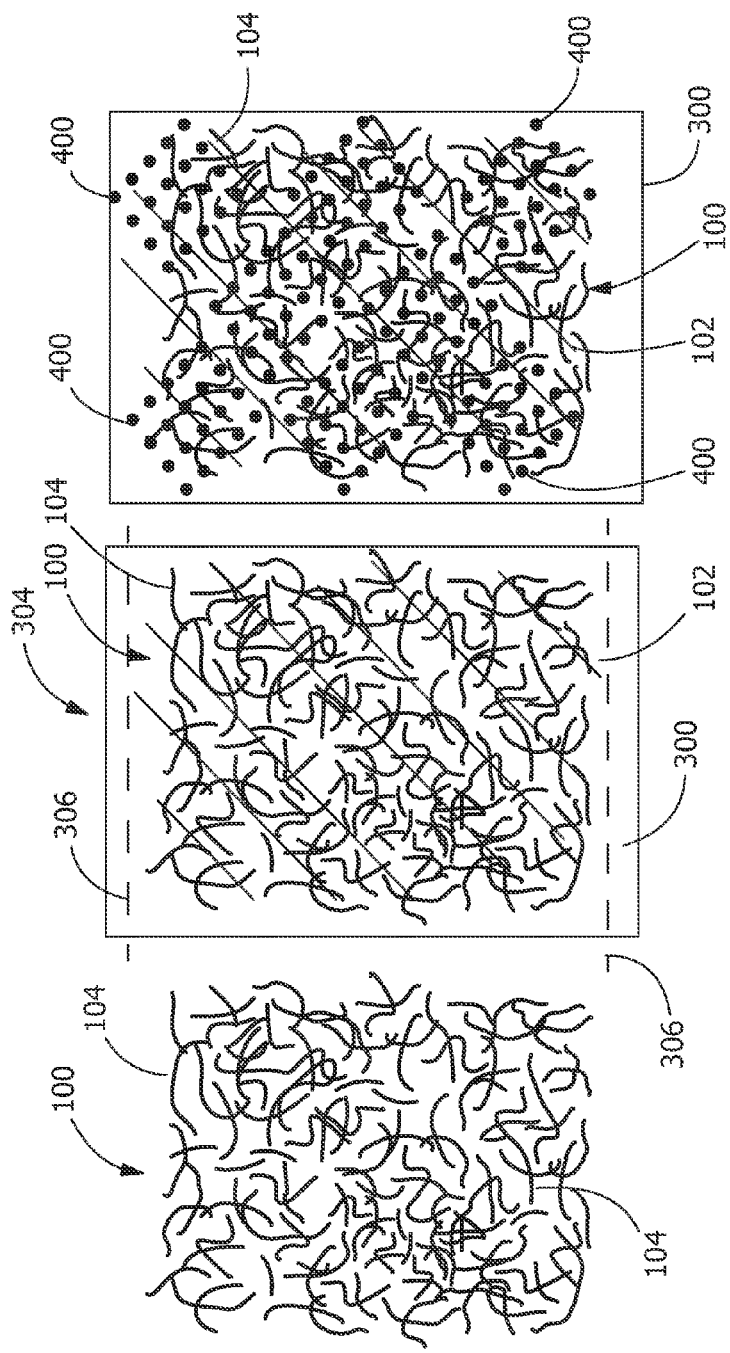

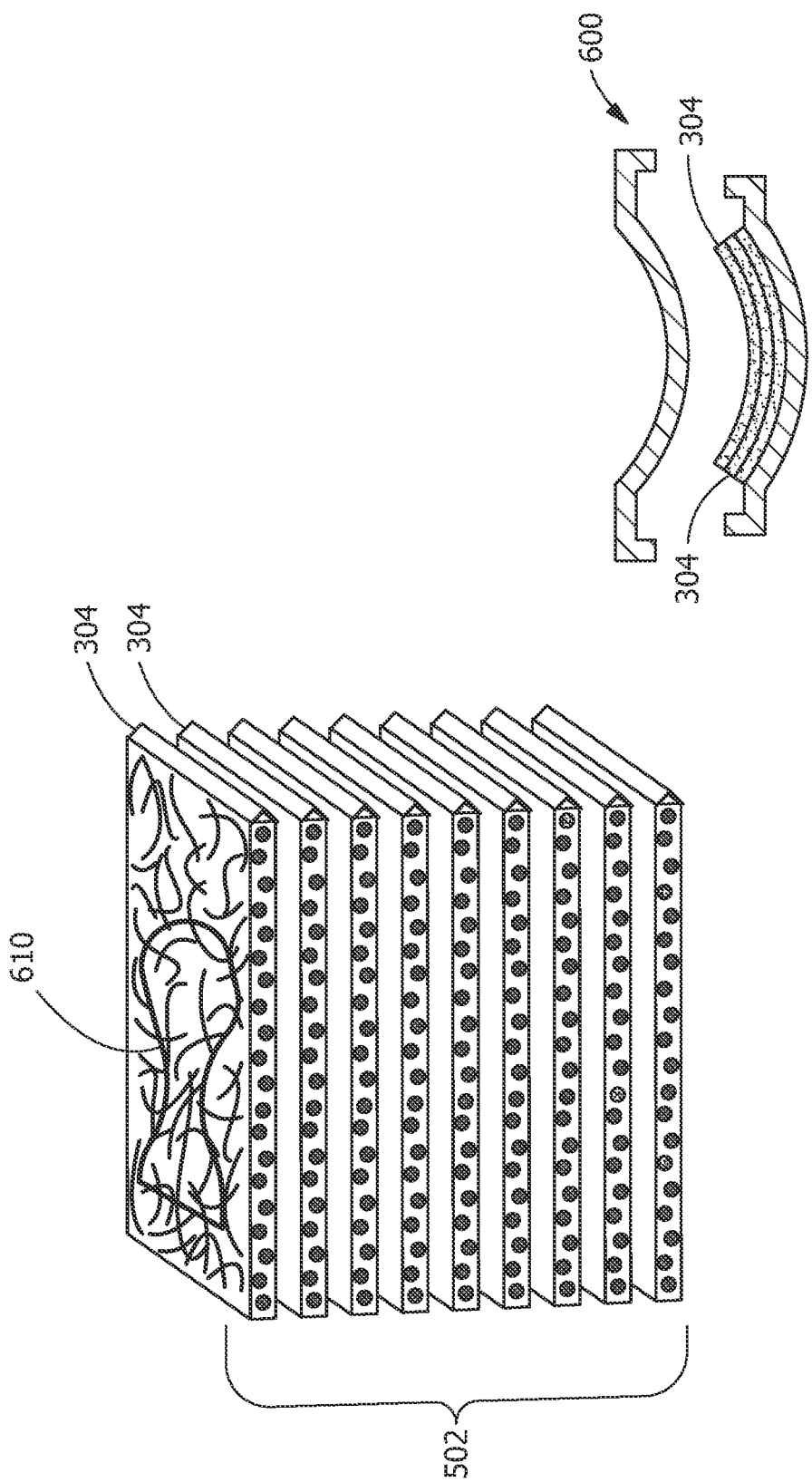

METHODS OF MAKING A COMPOSITE SHEET AND COMPOSITE COMPONENT AND A COMPOSITE

FIELD OF THE INVENTION

The present invention relates generally to a method of making composites, and more specifically, to a method of making a composite sheet and a method of making a composite component and composite.

BACKGROUND OF THE INVENTION

In composite fabrication methods, the utilization of random fibers involves a spraying based process that requires an open mold or using a dense mass of fibers formed into a thick felt material. The thick felt material is difficult to flex and form into small and thin articles.

In ceramic matrix composites, adding high temperature matrix media during article fabrication limits the ability to use random fiber orientation. The random fibers do not remain in the desired location if the locating media loses integrity at processing temperatures of 2000° F. or higher.

Therefore, a method for making composite sheets, a method for making a composite component, and a composite that do not suffer from the above drawbacks are desirable in the art.

SUMMARY OF THE INVENTION

According to an exemplary embodiment of the present disclosure, a method of making a composite sheet is provided. The method includes providing a container. The method includes adding a binder to the container. A plurality of randomly oriented fibers are added to the binder. The container is subjected to motion to coat the plurality of randomly oriented fibers with the binder to form a slurry. The binder and coated plurality of randomly oriented fibers are cured to form a composite sheet. The plurality of randomly oriented fibers are interlocked within the binder.

According to another exemplary embodiment of the present disclosure, a method of making a composite component is provided. A plurality of composite sheets are formed. Forming the composite sheets includes providing a container, adding binder, and adding a plurality of randomly oriented fibers to binder in container. The container is subjected to motion to coat the plurality of randomly oriented fibers with the binder forming a slurry, and curing the binder and coated plurality of randomly oriented fibers to form a composite sheet, wherein the plurality of randomly oriented fibers are interlocked within the binder. The slurry and coated plurality of randomly oriented fibers are dried to form a composite sheet, wherein the plurality of randomly oriented fibers become interlocked within the binder. A mold having a desired geometry is provided. The plurality of composite sheets are laid-up in the mold. The composite sheets and mold are heated to a burn-out temperature, wherein heating vaporizes the binder and creates a green ceramic component comprising the plurality of randomly oriented fibers joined by carbon bonds and having a plurality of voids. A matrix material is deposited in the voids and along the plurality of randomly oriented fibers forming the composite component.

According to another exemplary embodiment of the present disclosure, a composite is provided. The composite includes a plurality of composite sheets comprising a plurality of randomly oriented fibers interlocked in a cured binder. The composite has uniform strength in all planar directions.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a schematic view of a slurry including a plurality of fibers and a binder of the present disclosure.

FIG. 2 is a side sectional view of a container for mixing a slurry of the present disclosure.

FIG. 3 is a schematic top view of the container for mixing a slurry including a plurality of fibers and a binder of the present disclosure.

FIG. 4 is a schematic top view of the container for mixing a slurry including a plurality of fibers, a binder and carbon seeds of the present disclosure.

FIG. 5 is an exploded schematic view of a stack of a plurality of composite sheets of the present disclosure.

FIG. 6 is a schematic view of a mold for forming composite sheets of the present disclosure.

Wherever possible, the same reference numbers will be used throughout the drawings to represent the same parts.

DETAILED DESCRIPTION OF THE INVENTION

Figure 7:
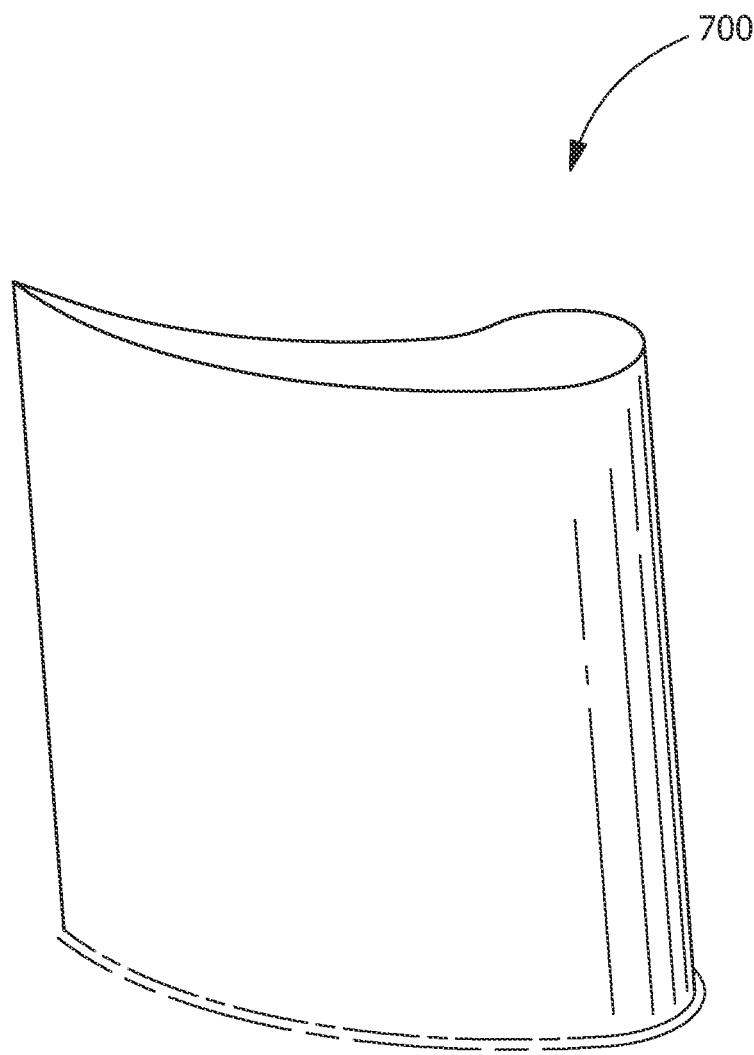
FIG. 7 is a schematic of a composite component of the present disclosure.

Provided is a method of making a composite sheet, a method of making a composite component, and a composite component. The present disclosure is generally applicable to composites including ceramic matrix composites (CMCs), plastic matrix composites (PMCs) and metal matrix composite (MMCs).

One advantage of an embodiment of the present disclosure includes a method and single layer composite sheet that provides a higher range of control and precision in position during composite construction than current standard fiber tapes and cross woven sheets in composite applications. Another advantage of an embodiment of the present disclosure is a method for generating a cellulose based transportation media for random fibers that provides a lower cost option to add fibers to composites than traditional approaches that use continuous fiber tapes or woven sheets. Yet another advantage of an embodiment of the present disclosure is the cellulose based transportation media provides a means to generate a random fiber single layer of fiber sheets that are not dense or bulky and are easily positioned. Another advantage of an embodiment of the present disclosure is a composite component that has uniform strength in all planar directions. Yet another advantage of an embodiment of the present disclosure is a process that provides near-uniform thickness of fibers providing a near-uniform ply thickness. Another advantage of an embodiment of the present disclosure is more uniform composite component thicknesses thereby limiting potential distortions in shape of the composite component. Another advantage of an embodiment of the present disclosure is plies having defined edges thereby preventing excessive trimming.

FIG. 1 is a schematic view of a plurality of randomly oriented fibers 104 laid out in a random pattern. As used herein, "plurality of randomly oriented fibers" 104 include single fibers and untwisted, twisted or woven batch of fibers or whiskers, also referred to as a tow. Plurality of randomly oriented fibers 104 include ceramic fibers, organic polymers, and carbon fibers, and metal matrix fibers. Plurality of randomly oriented fibers 104 are selected depending on the desired construction and use of composite sheet 304 (see FIG. 5). Plurality of randomly oriented fibers 104, as fibers, have a diameter of about 0.5 microns to about 150 microns, or alternatively about 5 microns to about 100 microns, or alternatively about 10 microns to about 50 microns. Plurality of randomly oriented fibers 104, as tows, have a diameter of 0.2 millimeters to about 5 millimeters or alternatively about 0.3 millimeters to about 4 millimeters, or alternatively about 0.5 millimeters to about 3.5 millimeters. Length of plurality of randomly oriented fibers 104, is about 0.127 millimeters to about 125 millimeters, or alternatively about 1 millimeters to about 100 millimeters, or alternatively about 10 millimeters to about 90 millimeters. Plurality of randomly oriented fibers 104 comprise about 5% to about 80%, or alternatively about 10% to about 75%, or alternatively about 15% to about 70%, by weight of composite sheet 304.

In one embodiment, composite sheet 304 is a CMC, and plurality of random fiber 104 are ceramic fibers selected from, but not limited to, carbon, silicon-carbide (SiC), silicon-dioxide ($SiO_2$), aluminum-oxide ($Al_2O_3$), mullite, zirconium dioxide ($ZrO_2$), silicon carbide incorporating Ti, Zr or Al, silicon oxy-carbide ($SiO_xC_y$), silicon boro-carbo-nitride ($SiB_xC_yN_z$), and combinations thereof. In an alternative embodiment, composite sheet 304 is a PMC, and the plurality of random fibers 104 include fibers suitable for reinforcement of polymers, selected from, but not limited to, carbon, aramid, glass, boron, poly-paraphenylene terephthalamide (KEVLAR®), and combinations thereof. In another embodiment, composite sheet 304 is a MMC, and plurality of random fibers 104 are fibers or particles suitable for reinforcement of metal matrix composites, selected from, but not limited to, carbon, silicon carbide, boron carbide, diamond, transition metal carbides, nitrides and silicides, metallic wires, and combinations thereof.

As shown in FIG. 2, plurality of randomly oriented fibers 104 are combined with a binder 102 to form a slurry 100 in a container 200. Construction for container 200 includes a framed box having a screen-like bottom tensioned over the frame for holding plurality of randomly oriented fibers 104 and binder 102 that form slurry 100. In forming composite sheet 304 (see FIG. 3), binder 102 is added to screen-like bottom of container 200 and rocked in a reciprocating motion, as shown by arrows 206 in FIG. 2. While binder 102 is being rocked, plurality of randomly oriented fibers 104 are added to binder 102 in container 200 forming slurry 100. As used herein "binder" 102 includes an organic or a solution of organics in a proper solvent, such as but not limited to an organic solvent or water. In one embodiment, prior to curing, slurry 100 includes about 10% to about 85% percent by weight solvent and about 2% to about 35% percent by weight binder 102. Slurry 100 is rocked in container 200 to produce an even distribution of binder 102 over plurality of randomly oriented fibers 104. The rocking or reciprocating motion also allows excess moisture in binder 102 to be drained away through screen-like bottom of container 200. The rocking or reciprocating motion is continued until plurality of randomly oriented fibers 104 are uniformly coated with binder 102 forming slurry 100. In one embodiment, binder 102 includes, but is not limited to, cellulose or carbon based materials, such as polyvinylbutyral, polyvinylacetate, polyvinyl alcohol, polymethyl methacrylate, phenolic resins and furfuryl alcohol-based resins. Slurry 100 is dried in an ambient air environment or by placing container 200 into a forced air drying oven operating at temperatures between about 37.78° C. (about 100° F.) to about 93.33° C. (about 200° F.). As slurry 100 dries, plurality of randomly oriented fibers 104 become interlocked within the dried binder 300 which forms a thin flexible composite sheet 304, which serves as a transport and positioning media for plurality of randomly oriented fibers 104 (see FIG. 3). Flexible composite sheet 304 has a thickness of approximately 0.030 millimeters to about 2.5 millimeters or alternatively about 0.050 millimeters to about 1 millimeters or alternatively about 0.10 millimeters to about 0.50 millimeters.

In one embodiment, natural carbon (from binder 102) in slurry 100 bonds with plurality of randomly oriented fibers 104 as slurry 100 dries and forms flexible composite sheet 304, as shown in FIG. 3. In an alternative embodiment, as shown in FIG. 4, carbon seeds 400 may be added to slurry 100 including plurality of fibers 104 and binder 102, prior to drying to provide additional carbon bonding locations for plurality of randomly oriented fibers 104 when slurry 100 is dried in to flexible composite sheets 304.

As shown in FIG. 3, flexible composite sheets 304 are trimmed, shown by dashed lined 306. The trimmed flexible composite sheets 304 may be stacked in the desired configuration with the desired number of trimmed flexible composite sheets 304 to form a stacked composite 502, as shown in FIG. 5. In one embodiment, a preform composite component may be cut, using any suitable method, such as, but not limited to carbide enhanced blades (scissors or single bladed cutters), ultrasonic knives, lasers, waterjet cutting, grinding, and combinations thereof, from stacked composite 502 and further process to form composite component 700 (see FIG. 7).

FIG. 6 illustrates a mold 600 for forming composite component 700 (see FIG. 7). Flexible composite sheets 304 are applied to mold 600. Mold 600 provides template to form desired geometry for composite preform 610 to form composite component 700 (see FIG. 7). Suitable examples of composite components 700, include, but are not limited to, airfoils, exhaust nozzles, and transition ducts.

After composite component preform 610 is removed from stacked composite 502, or from mold 600, component preform 610 is further processed depending on the underlying structure of flexible composite sheet 304, CMC, MMC, or PMC. Component preform 610 is heat or chemically treated to remove most of binder 102 from preform 610, leaving only coated plurality of randomly oriented fibers 104 joined by remaining binder 102. A matrix material is introduced to component preform 610 including plurality of randomly oriented fibers 104 and binder 102 is removed through thermal or chemical means. Suitable examples of matrix material include, but are not limited to aluminum oxide ($Al_2O_3$), beryllium oxide (BeO), cerium oxide ($CeO_2$), zirconium dioxide ($ZrO_2$), carbide, boride, nitride, silicide, mullite, silicon carbide, silicon, and combinations thereof. Suitable examples of matrix material for a CMC matrix is ceramic powder, including but not limited to, silicon carbide, aluminum-oxide, silicon oxide, and combinations thereof. Suitable examples of matrix material for a PMC include, but are not limited to, epoxy based matrices, polyester based matrices, and combinations thereof. Suitable examples of a MMC matrix material include, but are not limited to powder metals such as, but not limited to, aluminum or titanium that are capable of being melted into a continuous molten liquid metal which can encapsulate fibers 104 present in the assembly, before being cooled into a solid ingot with incased fibers. The resulting MMC is a metal article with increased stiffness, and the metal portion (matrix) is the primary load caring element.

For PMCs, curing activates or consolidates the matrix material of the whole assembled ply stack. Curing is accomplished by thermal activation of matrix media, usually, resins or polymers used to coat plurality of randomly oriented fibers 104 forming a thermoplastic with fiber encapsulation also known as thermosetting.

For MMCs, curing is accomplished through melting of the matrix media, usually, powder metal used to coat plurality of randomly oriented fibers 104 into metallic slurry 100 with fibers present, and then cooled to a continuous metallic with encapsulated fibers when cooled. The metal matrix media includes, but is not limited to, lighter metals such as aluminum, magnesium, or titanium.

For CMCs, curing is accomplished by thermal activation of the binder followed by pyrolyzing the binder to form carbon deposits, to encapsulate or bond together the plurality of randomly oriented fibers 104. The encapsulated or bonded plurality of randomly oriented fibers 104 are cooled.

After component preform 610 is cured, it is generally brittle, relative to the final component, because most of binder 102 has been removed during curing. Further processing of component preform 610 is dependent on underlying structure of flexible composite sheet 304, CMC, MMC, or PCM to form composite component 700. Further processing to obtain composite component 700 includes processing methods, such as, but not limited to, melt infiltration, slurry infiltration, reactive melt infiltration, polymer infiltration and pyrolysis, chemical vapor infiltration, and combinations thereof.

FIG. 7 depicts a composite component 700 formed using composite sheets 304 including a plurality of randomly oriented fibers 104. Composite component 700 includes smaller, more complex features as a result of the flexible sheet 304 being used to make composite component 700. Additionally, composite component 700 has uniform strength in all planar directions.

Figure 8:
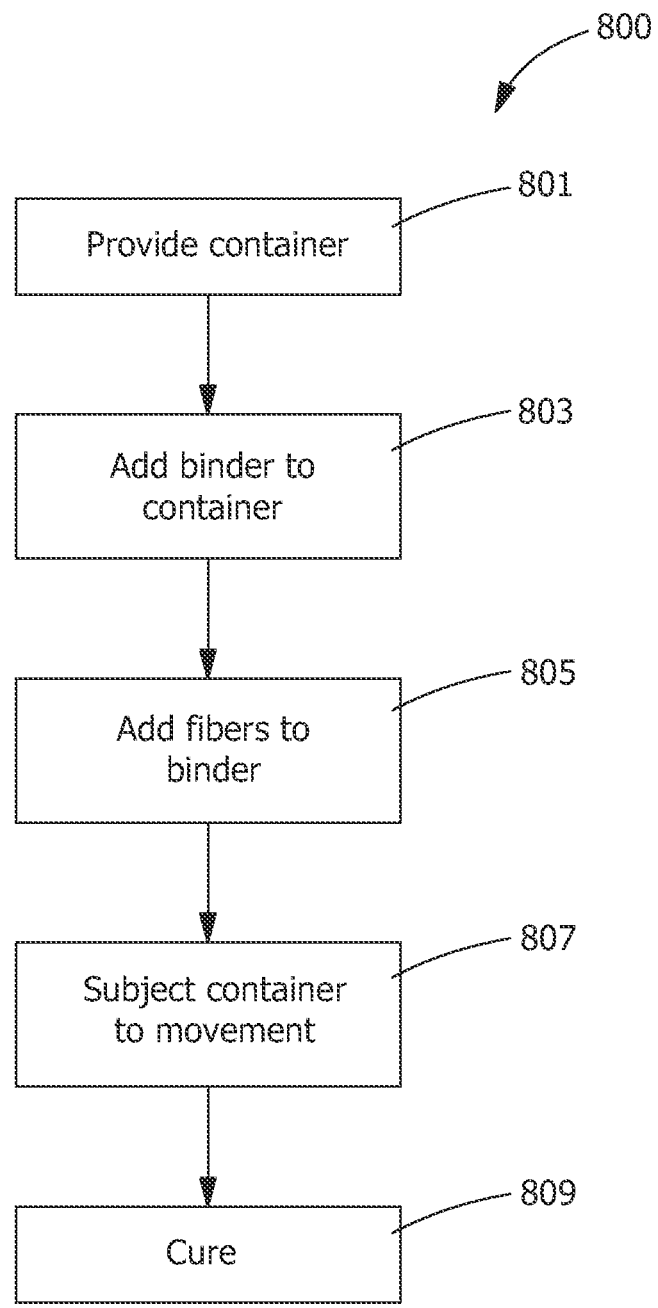
FIG. 8 is a flow chart of an exemplary method of making a composite sheet of the present disclosure.

FIG. 8 is a flow chart describing method 800 of making a composite sheet 304. Method 800 includes providing container 200 (see FIG. 2), step 801. Method 800 includes adding binder 102 to container 200 (see FIG. 2), step 803. Method 800 includes adding plurality of randomly oriented fibers to binder 102 (see FIG. 2.), step 805. Method includes subjecting container 200 to reciprocating motion, shown by arrows 206 to uniformly coat plurality of randomly oriented fibers 104 with binder 102 forming slurry 100 (see FIGS. 2 and 3), step 807. Method 800 includes curing slurry 100 and uniformly coated plurality of randomly oriented fibers 104 to form composite sheet 304 (see FIG. 3), step 809. Plurality of randomly oriented fibers 104 are interlocked within binder 102 of composite sheet 304.

Figure 9:
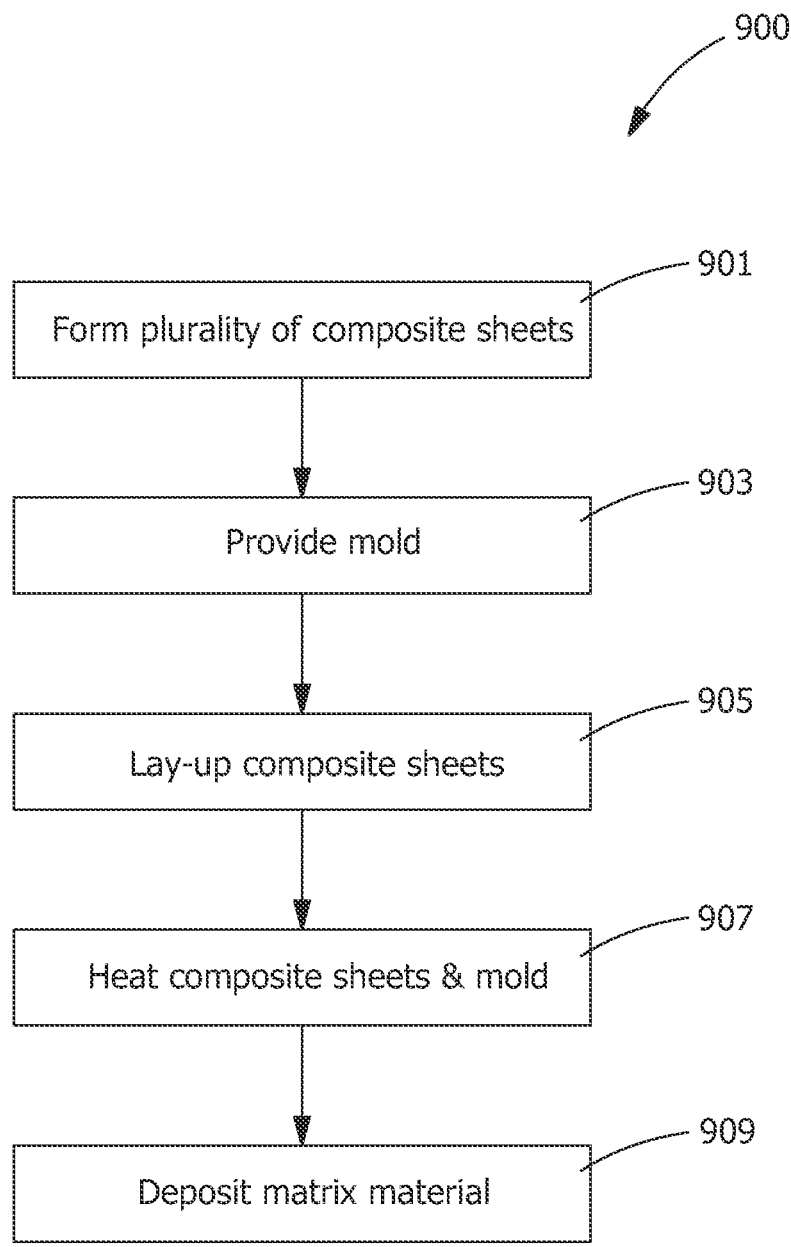
FIG. 9 is a flow chart of an exemplary method of making a composite component of the present disclosure.

FIG. 9 is a flow chart describing method 900 of making composite component 700 (see FIG. 7). Method 900 includes forming a plurality of composite sheets 304, (see FIGS. 3 and 5), step 901. Forming plurality of composite sheets 304, step 901, includes, providing container 200, adding binder 102 to container 200, adding plurality of randomly oriented fibers 104 to binder 102 in container 200, subjecting container 200 to reciprocating motion to uniformly coat plurality of randomly oriented fibers 104 with binder forming slurry 100, and curing slurry 100 including the binder and uniformly coated plurality of randomly oriented fibers 104 to form composite sheet 304 (see FIG. 3). Plurality of randomly oriented fibers 104 are interlocked within binder 102 (see FIG. 3). Method 900 includes providing a mold 600 having a desired geometry (see FIG. 6), step 903. Method 900 includes laying-up the plurality of composite sheets 304 in mold 600 (see FIG. 6), step 905. Method 900 includes heating composite sheets 304 and mold 600 to a burn-out temperature of about 315° C.

(approximately 600° F.) or greater, step 907. Heating vaporizes remaining binder 102 and creates a green ceramic component comprising plurality of randomly oriented fibers 104 joined by carbon bonds and having a plurality of voids. Method 900 includes depositing a matrix material in the voids and along the plurality of randomly oriented fibers 104 forming composite component 700 (see FIG. 7).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making a composite component, the method comprising:
   forming a plurality of flexible composite sheets, at least one of the flexible sheets formed by:
   providing a container;
   adding a binder to the container;
   adding a plurality of randomly oriented fibers to the binder in the container;
   forming a slurry by subjecting the container to motion so as to coat the plurality of randomly oriented fibers with the binder in the container; and
   drying the slurry to form the at least one flexible composite sheet of randomly oriented fibers interlocked within the dried binder, wherein the plurality of randomly oriented fibers comprises about 15% to about 70% by weight of the sheet;
   laying up a plurality of the flexible composite sheets in a mold;
   applying heat or chemical treatment to remove most but not all of the dried binder from the layup, remaining binder coating and joining the plurality of randomly oriented fibers so as to create a brittle component preform having a plurality of randomly oriented fibers and a plurality of voids therebetween;
   depositing a matrix material in the voids of the component preform and then removing the remaining binder by thermal or chemical means; and
   curing the matrix material so as to form the composite component.

2. The method of claim 1, wherein the plurality of fibers are selected from the group consisting of carbon, SiC, $SiO_2$, $Al_2O_3$, mullite, $ZrO_2$, $SiO_xC_y$, $SiB_xC_yN_z$, and combinations thereof.

3. The method of claim 2, wherein the matrix material is a ceramic.

4. The method of claim 1, wherein the plurality of fibers are SiC fibers, and wherein the matrix material is a metal selected from the group consisting of Ti, Zr, and Al.

5. The method of claim 1, wherein the plurality of fibers are selected from the group consisting of aramid, glass, boron, poly-paraphenylene terephthalamide, and combinations thereof.

6. The method of claim 5, wherein the matrix is a polymer and said curing is by thermal activation.

7. The method of claim 1, wherein the plurality of fibers are selected from the group consisting of transition metal carbides, metal nitrides, metal silicides, metal wire, boron carbide, diamond, and combinations thereof.

8. The method of claim 7, wherein the matrix material is a metal.

9. The method of claim 1, wherein said removing of most of the binder includes heating the plurality of flexible composite sheets and mold to a temperature sufficient to vaporize the binder.

10. The method of claim 1, wherein the binder is a carbon based material selected from the group consisting of cellulose, polyvinyl butyral, polyvinyl acetate, polyvinyl alcohol, polymethyl methacrylate, phenolic resins, and furfuryl alcohol-based resins.

11. The method of claim 1, wherein the container is a framed box having a screen-like bottom tensioned over the frame.

12. The method of claim 1, wherein the composite component is a ceramic matrix composite component, and said removing of most of the dried binder includes pyrolizing the dried binder to form carbon deposits that encapsulate or bond the plurality of randomly oriented fibers.

13. The method of claim 1, wherein the at least one flexible composite sheet has a thickness of approximately 0.030 millimeters to 2.5 millimeters.

14. The method of claim 1, wherein the slurry comprises about 10% to about 85% by weight solvent and about 2% to about 35% by weight of the binder.

* * * * *